United States Patent Office 3,165,554
Patented Jan. 12, 1965

3,165,554
OXIDATION OF CYCLIC AND ALIPHATIC ALCOHOLS
William H. Wineland, Midland, Mich., assignor to The Dow Chemical Company, Midland, Mich., a corporation of Delaware
No Drawing. Filed July 25, 1962, Ser. No. 212,461
7 Claims. (Cl. 260—586)

The present invention relates to a new and useful method for oxidation of secondary alcohols to their corresponding ketones. More particularly, the present invention relates to the chlorine oxidation of cyclic and aliphatic secondary alcohols which may be substituted with an aromatic hydrocarbon radical of the benzene series to their corresponding ketones at higher temperatures than heretofore known with the result of improved yields in desired product.

The chlorine oxidation of a secondary alcohol to its corresponding ketone at low temperatures is well known in the art. However, even at the low temperatures of $-30°$ to $-10°$ C. the processes to date have usually been accompanied by low yields and conversions and further complicated by chlorination of some of the ketone, thus even further reducing the yields and conversions to desired product. At higher temperatures, i.e. above $0°$ C., the prior art teaches chlorination of the ketone is markedly increased.

In accordance with the present invention secondary alcohols (i.e., aliphatic alcohols, cyclic alcohols, bicyclic alcohols and phenyl substituted aliphatic and cyclic alcohols) are oxidized with chlorine or bromine or mixtures thereof in the presence of a hydrogen halide acceptor such as $CaCO_3$, $MgCO_3$ or mixtures thereof, such as Dolomite, in an aqueous reaction medium at high temperatures, i.e. from about $0°$ to about $100°$ C. to obtain the corresponding unchlorinated ketone in good yields. Good results are obtained when chlorine or bromine or mixtures thereof is employed in an amount of from 0.25 to 1.2 moles per mole of secondary alcohol; when the hydrogen chloride acceptor is employed in from that amount necessary to accept the theoretical chloride of reaction to 12.5 percent in excess of the theoretical; and, when the aqueous phase contains from 1.5 to 4 times by weight of water based on the weight of secondary alcohol. When the lower water-alcohol ratio is employed, the reaction is preferably carried out in a step-wise manner, i.e., only a portion of the chlorine is added, the organics, acid and water are separated from the inorganic salt and the chlorination repeated until the theoretical chlorine has been added.

The temperature of the reaction can range from $0°$ to $100°$ C. depending upon the cooling available, the rate of introduction of chlorine and the hydrogen chloride acceptor employed. Preferably the temperature is from about $45°$ to about $60°$ C.

The preferred hydrogen halide acceptors are magnesium carbonate, calcium carbonate, Dolomite (mixtures of $CaCO_3$-$MgCO_3$) and the like. Other useful acceptors are the carbonates and bicarbonates of the alkali and alkaline earth metals and the hydroxides and oxides of the alkaline earth metals and ammonia.

The amount of chlorine employed is from 0.25 to 1.2 moles per mole of secondary alcohol and preferably from 50 to 90 percent of the theoretical to react with the secondary alcohol.

Substantially any secondary alcohol can be converted to its corresponding ketone. Thus one can convert the aliphatic secondary alcohols such as the secondary alkanols, e.g., 2-propanol, 2-butanol, 2-pentanol, 3-pentanol, 2-hexanol, 3-hexanol, 2-heptanol, 3-heptanol, 4-heptanol, 2-octanol, 3-octanol, 4-octanol, 2-nonanol, 3-nonanol, 4-nonanol, 5-nonanol, and the like to their corresponding ketones and the cyclic alcohols, such as the secondary cycloalkanols, e.g., cyclohexanol, cyclopentanol, methyl cyclohexanol, the cyclohexylcyclohexanols and the like and the aryl substituted secondary aliphatic and cyclic alcohols, such as α-hydroxyethyl benzenes and the like, or 2-phenylcyclohexanol and the like to their corresponding ketones.

The following examples are illustrative of the present invention but are not to be construed as limiting:

Example 1

In a 3000 ml.-3 neck Morton type flask equipped with a power stirrer (tru-bore; C blade), thermometer, reflux condenser and two extra coarse sintered glass gas inlet sparger tubes (8.3 cm.$^2$ surface per sparger) was charged: 400 grams cyclohexanol, 430 grams $CaCO_3$ (precipitated), and 1600 ml. water.

The reaction flask was then immersed in a warm water bath and the flask maintained at a temperature range of $57$–$60°$ C. At this temperature range 145 grams chlorine were added at the rate of 0.58 gram per minute with full agitation. After the completion of the chlorine addition the reaction was stirred for ½ hour and then steam distilled from the reaction flask. A clear, water-white oil weighing 429 grams was obtained. This oil analyzed by infra-red had an assay of 50 percent cyclohexanone and 50 percent cyclohexanol.

Examples 2–7

In a similar manner varying the conditions the results indicated below were obtained.

| Ex. No. | H$_2$O-cyclo-hexanol wt. ratio | Wt. of cyclo-hexanol charge in pounds | Gal. H$_2$O charge | Wt. of calcium carbonate in charge in pounds | Wt. of Cl$_2$ charged in pounds | Chlorine rate | Temperature reaction zone, ° C. | Wt. of wet oil distilled in pounds | Percent of theory of oil recovered | Percent of theoretical Cl percent added | Percent cyclo-hexanone | Percent cyclo-hexanol | Percent 2-chloro-cyclo-hexanone | Percent Cl |
|---|---|---|---|---|---|---|---|---|---|---|---|---|---|---|
| 2 | 3:1 | [1] 396.5 | [1] 1,200 | [1] 260 | [1] 174 | 2.60 g./min | 42–50 | [1] 428 | 96.4 | 60 | 60 | 38 | 0.7 | |
| 3 | 3:1 | [1] 397.0 | [1] 1,200 | [1] 300 | [1] 203 | 2.48 g./min | 48–51 | [1] 434 | 95.7 | 70 | 69 | 29.5 | 0.8 | |
| 4 | 3:1 | 176 | 64 | 111 | 64 | 8 lbs. hr | 25–29 | | | 50 | | | | |
| | | | | 44 | 25.5 | 8 lbs. hr | 25–29 | | | 70 | | | | |
| | | | | 33 | 19.5 | 8 lbs. hr | 25–29 | | | 85 | 84 | 14 | 1.4 | 0.72 |
| 5 | 2:1 | 200 | 50 | 188 | 110 | {20 lbs. hr / 20 lbs. hr} | {28 / 30.5} | 212.0 | 96.8 | {50 / 75} | {52 / 76} | {46 / 23} | | {0.19} |
| 6 | 1.5:1 | 233 | 36 | 100 | {28.5 / 42.0 / 49.5 / 57.0} | {20 lbs. hr / 20 lbs. hr / 20 lbs. hr} | 45–50 | | | | | | | |
| 7 | 3:1 | [2] 146 | [3] 1,800 | [1] 185 | [1] 115 | 73 g./hr | 45–50 | [1] 588.9 | 95 | 90 | 91 | 9 | | 0.17 |
| | | | | | | | | | 95 | 111 | 100 | | | |

[1] Grams.
[2] Synthetic mixture of 146 grams cyclohexanol—448 grams cyclohexanone to simulate proportional addition of chlorine and extraction of CaCO$_3$.
[3] Milliliters.

Example 8

In the manner of Example 1, employing the following amounts of reactants 455.6 grams octanol-2 (3.5 mol)
1500 ml. $H_2O$
400 grams $CaCO_3$
255 grams chlorine and a chlorine addition time of 3 hours and 50 minutes at a temperature of from 7–14° C., there was obtained 441.7 grams of wet oil which analyzed 90 percent 2-octanone, 5 percent unreacted octanol-2 and 5 percent chloro-2-octanone.

Example 9

In the manner of Example 1 employing the following amount of reactants 488 grams phenyl ethyl alcohol
1000 ml. $H_2O$
1650 ml. $CH_2Cl_2$
450 grams $CaCO_3$ and 295 grams of $Cl_2$ added over a 4 hour 10 minute period at a temperature of 4°–9° C. there was obtained 496.2 grams of wet oil analyzed by infra red about 96 percent acetophenone representing a 93 percent yield of product based on the starting alcohol.

Example 10

In a manner similar to Example 1 employing 526 grams 2-phenyl cyclohexanol
1000 ml. $H_2O$
1650 ml. $CH_2Cl_2$
350 grams $CaCO_3$ and 220 grams $Cl_2$ added over a 2 hour 23 minute period at 9°–12° C. there was obtained a 90 percent yield of 2-phenyl cyclohexanone based on alcohol consumed.

This application is a continuation-in-part of my co-pending application Serial No. 844,208, filed October 5, 1959, now abandoned.

I claim:

1. A method for converting a secondary alcohol to its corresponding ketone which comprises reacting in the aqueous phase a second alcohol selected from the group consisting of secondary alkanols, phenyl secondary alkanols, cycloalkanols, cyclohexylcyclohexanols and phenyl cycloalkanols with a halogen selected from the group consisting of chlorine and bromine in the presence of a hydrogen halide acceptor selected from the group consisting of the carbonates and bicarbonates of the alkali and alkaline earth metals and the hydroxides and oxides of alkaline earth metals and ammonia at a temperature of from 0° to 100° C., the molar ratio of halogen to alcohol being between about 0.25 to 1.2.

2. The method as set forth in claim 1 wherein said reaction is carried out at a temperature of from 25° to 60° C.

3. The method as set forth in claim 1 wherein said halogen is chlorine.

4. The method as set forth in claim 2 wherein said halogen is chlorine.

5. The method as set forth in claim 4 wherein said alcohol is cyclohexanol.

6. The method as set forth in claim 4 wherein said alcohol is 2-phenyl cyclohexanol.

7. The method as set forth in claim 4 wherein said alcohol is 1-phenyl ethanol.

References Cited in the file of this patent

UNITED STATES PATENTS 2,444,924     Farkas et al. _____ July 13, 1948